United States Patent Office 3,154,543
Patented Oct. 27, 1964

3,154,543
PREPARATION OF 5-AMINOFURANS
Frank F. Ebetino and Gabriel Gever, Norwich, N.Y., assignors to The Norwich Pharmacal Company, a corporation of New York
No Drawing. Filed Sept. 18, 1961, Ser. No. 138,614
1 Claim. (Cl. 260—240)

This invention relates to 5-aminofurans. More particularly, this invention is concerned with an improved method for preparing and securing 5-amino-2-substituted furans.

Certain 5-nitrofurans have become well known as chemotherapeutic agents; e.g., 1-(5-nitrofurfurylideneamino)hydantoin; 5-morpholinomethyl-3-(5-nitrofurfurylideneamino)-2-oxazolidone, 5-nitro-2-furaldehyde semicarbazone, and 3 - (5-nitrofurfurylideneamino)-2-oxazolidone. Their widespread use as chemotherapeutants in combatting diseases of human beings and domestic animals has naturally led to inquiry and research as to their behavior in biological environment and what influence such environment might have on them.

Since these compounds contain a nitro group, which is well known to be susceptible to reductive forces, much has been written that one of the immediate biologic degradation products is an aminofuran which exists only transitorily.

Conclusivity on this score has failed, primarily due to the inability to readily obtain these aminofurans in sufficiently pure form to enable a full or even approximate appreciation and study of their characteristics. That such enlightenment would be valuable is emphasized by current requirements placed upon additives in foodstuffs demanding a delineation of their ultimate distribution.

We have now discovered that 5-amino-2-substituted furans represented by the formula:

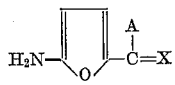

in which

X represents a member of the group consisting of oxygen and N-R wherein R is a radical selected from the group consisting of ureido, 2,4-dioxo-1-imidazolidyl, 2-oxo-3 - oxazolidyl, 2 - oxo - 5 - (n-morpholinyl)methyl-3-oxazolidyl, acetamido, 2-oxo-1-pyrrolidyl, 2-thiono-1-imidazolidyl and 2-oxo-1-imidazolidyl; and
A represents a member of the group consisting of hydrogen and methyl;

can be easily prepared by catalytic reduction of the corresponding 5-nitrofuran and can be readily isolated in good yield and in substantially pure form. The aminofurans prepared according to our invention are crystalline solids which can be fully characterized. They undergo characteristic reactions of amines; e.g., soluble in acids; with appropriate aldehydes colored Schiff's bases can be formed; and with the acylating agents, acylamides can be produced. They provide a precise standard for comparative identification purposes. The 5-aminofuraldehyde of our invention is a highly reactive substance and can be employed in condensation reactions with a variety of carbonyl derivatizing agents; e.g. hydrazines.

In accordance with our invention the nitrofuran dissolved or suspended in an organic solvent is hydrogenated in the presence of a suitable catalyst. Various organic solvents can serve as the reaction medium. Suitable solvents include those which are relatively inert to the reactants and the reaction products; e.g. alkanols, esters and mixtures thereof. The catalyst is of the noble metal variety deposited upon a carrier; e.g., palladium on charcoal. The hydrogenation can be carried out at ambient or slightly elevated temperature and pressure.

The method we currently prefer and which we have found to produce superior results consists in suspending the nitrofuran in a solvent comprising ethyl acetate and absolute ethanol in the proportion of about 3 parts; 1 part by volume, adding the catalyst consisting of 5% palladium on charcoal and introducing hydrogen under pressure of from about 2–3 atmospheres at ambient temperature until the theoretical amount is taken up. The product is recovered in known fashion; e.g. filtration of the catalyst and recovery from the filtrate of the desired end product by crystallization. Suitable solvents for effecting isolation include those in which the end product is relatively soluble; e.g., dimethyl sulfoxide and dimethylformamide and those which have substantially no solvent power for the end product; e.g., isopropanol, diethyl ether and water serve as precipitating agents. The product may be recrystallized from solvents such as dimethyl sulfoxide, acetonitrile, dimethylformamide and nitromethane; or it may be purified by adding aqueous acid, followed by precipitation by neutralization with a base.

In order that our invention may be readily available to and understood by those skilled in the art, the following illustrative examples are appended.

EXAMPLE I

5-Amino-2-Furaldehyde

A suspension of 7 g. (0.05 mole) of nitrofurfural and 3 g. of 5% palladium on charcoal in a mixture of 150 ml. of ethyl acetate and 50 ml. of absolute alcohol is hydrogenated at a pressure of 2–3 atmospheres. After 45 mins., the theoretical amount of hydrogen is taken up and the catalyst is filtered. The filtrate is concentrated in vacuo to give a gummy solid which is triturated with warm isopropanol and then recrystallized from acetonitrile. There are obtained 1.5 g. (13.5%) having the following elemental analysis:

| | C | H | N |
|---|---|---|---|
| Calc | 54.05 | 4.54 | 12.61 |
| Fd | 53.92 | 4.87 | 12.51 | and ultraviolet absorption in water: $\lambda$ max.$=350$ m$\mu$ ($E_m=29,600$).

EXAMPLE II 3-(5-Aminofurfurylideneamino)-2-Oxazolidone

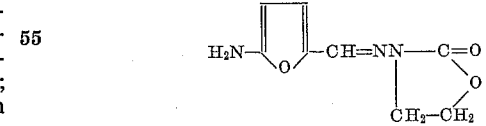

A suspension of 225 g. (1 mole) of 3-(5-nitrofurfurylideneamino)-2-oxazolidone and 26 g. of 5% Pd/C in 1840 ml. of methanol is hydrogenated at about atmospheric pressure in a flask with stirring. The theoretical amount of hydrogen (3 moles) is consumed in 2¼ hours; while maintaining the internal temperature at 40–45° C. The solid is filtered and air-dried (153 g.). This is dissolved in 8.3 ml. per gram of dimethyl sulfoxide and heated two to three hours with charcoal and then filtered. The filtrate is poured into a mixture of three times its volume of water containing an equal weight in grams of ice, to precipitate the product which is collected and rinsed with isopropyl alcohol. After this treatment is repeated a second time, there are obtained 77 g. of 3-(5-aminofurfurylideneamino)-2-oxazolidone having the following elemental analysis:

|  | C | H | N |
|---|---|---|---|
| Calc | 49.23 | 4.65 | 21.53 |
| Fd | 49.11 | 4.68 | 21.60 | and having the following ultraviolet absorption in water: λ max.=340 mμ ($E_m$=22,250).

EXAMPLE III

*1-(5-Aminofurfurylideneamino)Hydantoin*

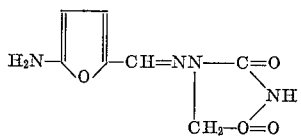

A suspension of 25 g. (0.105 mole) of 1-(5-nitrofurfurylideneamino)hydantoin and 5 g. of 5% Pd/C in 200 ml. of methanol is hydrogenated at a pressure of 2-3 atmospheres. The theoretical amount of hydrogen is taken up in 80 mins. The mixture is filtered and the solid washed with methanol. Two such reductions were carried out. The combined crude solids (40 g.) are extracted with 400 ml. of dimethyl sulfoxide. The insoluble materials are filtered and rinsed with 100 ml. of dimethyl sulfoxide. The combined filtrates were then poured into 3 ml. of ice-water and the solid filtered and washed with water, methanol and ether. The yield of 1-(5-aminofurfurylideneamino)hydantoin is 24.5 g. (M.P. 242.4°) having the following elemental analysis:

|  | C | H | N |
|---|---|---|---|
| Calc | 46.16 | 3.87 | 26.92 |
| Fd | 46.02 | 4.20 | 26.63 | and having the following ultraviolet absorption in water: λ max.=348 mμ ($E_m$=23,800).

EXAMPLE IV

*1-(5-Aminofurfurylideneamino)-2-Imidazolidinethione*

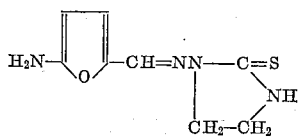

A suspension of 12 g. (0.05 mole) of 1-(5-nitrofurfurylideneamino)-2-imidazolidinethione and 15 g. of 5% Pd/C in 150 ml. of methanol is hydrogenated at a pressure of 2-3 atmospheres. The reduction is complete in 6½ hours. The insoluble solid is filtered and rinsed with methanol. This solid is extracted with 125 ml. of warm (60°) dimethylformamide and the extract poured into 750 ml. of cold isopropanol. The yield of precipitated products, 1-(5-aminofurfurylideneamino)-2-imidazolidinethione is 7.2 g. (M.P. 193.5–195°) having the following elemental analysis:

|  | C | H | S |
|---|---|---|---|
| Calc | 45.71 | 4.80 | 15.25 |
| Fd | 45.48 | 4.94 | 15.09 | and having the following ultraviolet absorption: λ max.=360 mμ ($E_m$=23,900).

EXAMPLE V

*3-(5-Aminofurfurylideneamino)-5-(4-Morpholinylmethyl)-2-Oxazolidone*

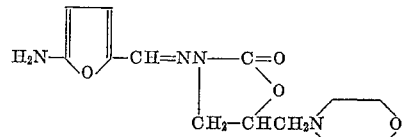

A mixture of 32.4 g. (0.1 mole) N-(5-nitrofurfurylidene)-3-amino-5-(N'-morpholinylmethyl)-2-oxazolidone, 4 g. 5% Pd on carbon and 200 ml. of methanol is hydrogenated at a pressure of 2-3 atmospheres. The hydrogenation is complete after 32 mins. The mixture is cooled to room temperature and the solid filtered and rinsed with methanol. The crude solid (23.8 g.) is recrystallized from 325 ml. of nitromethane to give 14.7 g. (M.P. 205°) having the following elemental analysis:

|  | C | H | N |
|---|---|---|---|
| Calc | 53.05 | 6.16 | 19.04 |
| Fd | 53.19 | 6.52 | 18.71 | and having the following ultraviolet absorption in water: λ max.=340 mμ ($E_m$=23,900).

EXAMPLE VI

*1-(5-Aminofurfurylidenamino)-2-Pyrrolidone*

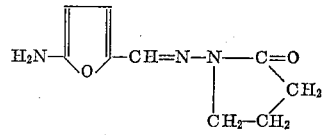

N-(5-nitrofurfurylidene)-1-amino-2-pyrrolidone is reduced at a pressure of 2-3 atmospheres: 0.1 mole of compound, 4.0 gms. of 5% Pd/C and 200 cc. of methanol. After filtration, the filter cake is extracted with 400 cc. boiling nitromethane, filtered and the filtrate set aside. From this, about 6 gms. of brown, crystalline 1-(5-aminofurfurylideneamino)-1-pyrrolidone precipitates (M.P. 214–216°) having the following elemental analysis:

|  | C | H | N |
|---|---|---|---|
| Calc | 53.95 | 5.74 | 21.75 |
| Fd | 55.83 | 5.81 | 22.00 | and having the following ultraviolet absorption in water: λ max.=350 mμ ($E_m$=23,700).

EXAMPLE VII

*5-Amino-2-Furaldehyde Semicarbazone*

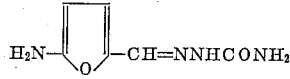

A suspension of 6 g. of 5% Pd/C and 10 g. (0.05 mole) of 5-nitro-2-furaldehyde semicarbazone in a mixture of 150 ml. of ethyl acetate and 50 ml. of absolute alsohol is hydrogenated at a pressure of 2-3 atmospheres. After 40 mins. the theoretical amount of hydrogen is taken up and the catalyst is removed by filtration. The filtrate is cooled in an ice bath and acidified with 10% HCl to produce an orange solid (6.8 g.) (66.5%) (M.P. 165–170°) having the following elemental analysis:

|  | C | H | Cl |
|---|---|---|---|
| Calc | 35.25 | 4.43 | 17.33 |
| Fd | 35.53 | 4.64 | 17.38 | and having the following ultraviolet absorption in water: λ max.=340 mμ ($E_m$=16,500).

The salt can be readily converted to the base by neutralizing with a base; e.g. aqueous sodium bicarbonate whereby the free amino compound having the following elemental analysis:

|  | C | H |
|---|---|---|
| Calc | 42.85 | 4.80 |
| Fd | 42.79 | 5.23 | and having the following ultraviolet absorption in water: λ max.=335 mµ ($E_m$=14,900), is secured.

EXAMPLE VIII

*3-(5-Amino-α-Methylfurfurylideneamino)-2-Oxazolidone*

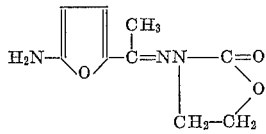

A suspension of 12 g. (0.05 mole) of N-[1-(5-nitro-2-furyl)ethylidene]-3-amino-2-oxazolidone and 3.5 g. of 5% Pd/C in a mixture of 175 ml. of ethyl acetate and 25 ml. of absolute alcohol is hydrogenated at a pressure of 2–3 atmospheres. After complete hydrogenation (25 mins.) the mixture is filtered and the filtrate concentrated in vacuo to an oil which becomes crystalline in a 50:50 mixture of acetonitrile and ether. The yield of 3-(5-amino-α-methylfurfurylideneamino)-2-oxazolidone is 3 g. (M.P. 141–147°) having the following elemental analysis:

|  | C | H | N |
|---|---|---|---|
| Calc | 51.67 | 5.30 | 20.09 |
| Fd | 51.90 | 5.39 | 20.00 | and having the following ultraviolet absorption in water: λ max.=365 mµ ($E_m$=16,500).

EXAMPLE IX

*1-(5-Aminofurfurylideneamino)-2-Imidazolidone*

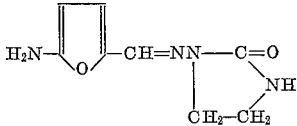

A suspension of 22 g. (0.1 mole) of N-(5-nitrofurfurylidene)-1-amino-2-imidazolidone and 5 g. of 5% Pd/C in 200 ml. of methanol is hydrogenated at a pressure of 2–3 atmospheres. The theoretical amount of hydrogen is taken up in 35 mins. The insoluble solid is filtered, combined with the solid obtained from a second 0.1 mole run and stirred in 700 ml. of dimethyl sulfoxide for 30 mins. After filtration the filtrate is poured into a stirred solution of 1400 ml. of ether and 1400 ml. of isopropanol. The mixture is cooled and the solid filtered and rinsed with methanol. The yield of 1-(5-aminofurfurylideneamino)-2-imidazolidone is 12 g. (M.P. 208–215°) having the following elemental analysis:

|  | C | H |
|---|---|---|
| Calc | 49.48 | 5.19 |
| Fd | 49.70 | 5.34 | and having the following ultraviolet absorption in water: λ max.=335 mµ ($E_m$=21,500).

EXAMPLE X

*5-Amino-2-Furaldehyde Acetylhydrazone*

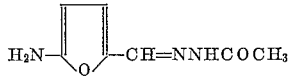

A suspension of 10 g. (0.05 mole) of 5-nitro-2-furaldehyde acetylhydrazone and 1.5 g. of 5% Pd/C in a mixture of 150 ml. of ethyl acetate and 50 ml. of absolute alcohol is hydrogenated at a pressure of 2–3 atmospheres. The theoretical amount of hydrogen is taken up in 32 minutes and the hydrogenation is stopped. The catalyst is filtered and the filtrate concentrated. The tan crystalline solid is triturated with ethanol to give 4.85 g. of 5-amino-2-furaldehyde acetylhydrazone (M.P. 155–158°) having the following elemental analysis:

|  | C | H | N |
|---|---|---|---|
| Calc | 50.29 | 5.43 | 25.14 |
| Fd | 50.10 | 5.44 | 25.00 | and having the following ultraviolet absorption in water: λ max.=349 mµ ($E_m$=19,700).

What is claimed is:

The method of preparing a crystalline and characterizable 5-aminofuran corresponding to the formula:

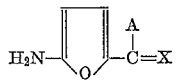

in which
X represents a member of the group consisting of oxygen and N-R wherein R is a radical selected from the group consisting of ureido, 2,4-dioxo-1-imidazolidyl, 2-oxo-5-(N-morpholinyl)methyl-3-oxazolidyl, acetamido, 2-oxo-1-pyrrolidyl, 2-thiono-1-imidazolidyl and 2-oxo-1-imidazolidyl; and
A represents a member of the group consisting of hydrogen and methyl;
which comprises catalytically hydrogenating a nitrofuran having the formula:

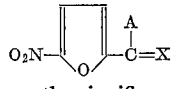

in which X and A have the significance given above in the presence of a solvent consisting of ethyl acetate and absolute ethanol in the proportion of about 3:1 by volume and a catalyst consisting of 5% palladium on charcoal and at a pressure of about 2–3 atmospheres.

References Cited in the file of this patent

Beckett et al.: J. Med. and Pharm. Chem., vol. 1 (1959), pages 137 and 143.